United States Patent [19]

Andruska et al.

[11] Patent Number: 5,652,790
[45] Date of Patent: Jul. 29, 1997

[54] HIERARCHICAL SWITCH SUPPORT OF SERVICES FOR SUBSCRIBERS BASED ON ORGANIZATIONAL MEMBERSHIP

[75] Inventors: Donald Lee Andruska, Glen Ellyn; Liane Toy Tsai, Wheaton, both of Ill.

[73] Assignee: Lucent Technologies Inc., Murray Hill, Del.

[21] Appl. No.: 556,322

[22] Filed: Nov. 16, 1995

[51] Int. Cl.$^6$ .............. H04M 3/42; H04M 7/00; H04Q 11/04
[52] U.S. Cl. .......... 379/207; 379/220; 379/229; 379/230; 370/360
[58] Field of Search .............. 370/60.1, 94.1, 370/110.1; 379/207, 210, 211, 212, 215, 216, 219, 220, 221, 222, 224, 229, 230

[56] References Cited

U.S. PATENT DOCUMENTS 5,222,120  6/1993  McLeod et al. .................. 379/88
5,247,571  9/1993  Kay et al. ..................... 379/230 X Primary Examiner—Thomas W. Brown
Assistant Examiner—Harry S. Hong
Attorney, Agent, or Firm—Charles L. Warren

[57] ABSTRACT

A telecommunication network includes first subscribers supported by a first local telecommunication switch. A first signal is received from the first switch at a second telecommunication switch disposed at a hierarchical level above the first switch. The first signal indicates to the second switch that features based on organizational affiliation of the calling party are to be provided. A second signal is received at the second switch from the first switch indicative of the identification of the calling party. A record in a database coupled to the second switch is located in response to receiving the second signal; the location of the record being based on the identification of the calling party. A group affiliation parameter stored in said record is identified; the group affiliation parameter defines one organization of which the calling party is a member. The second switch transmits a call setup message to a third switch associated with a called party. The call setup message includes the group affiliation parameter so that the calling party's membership in the one organization is available for further call processing.

8 Claims, 1 Drawing Sheet

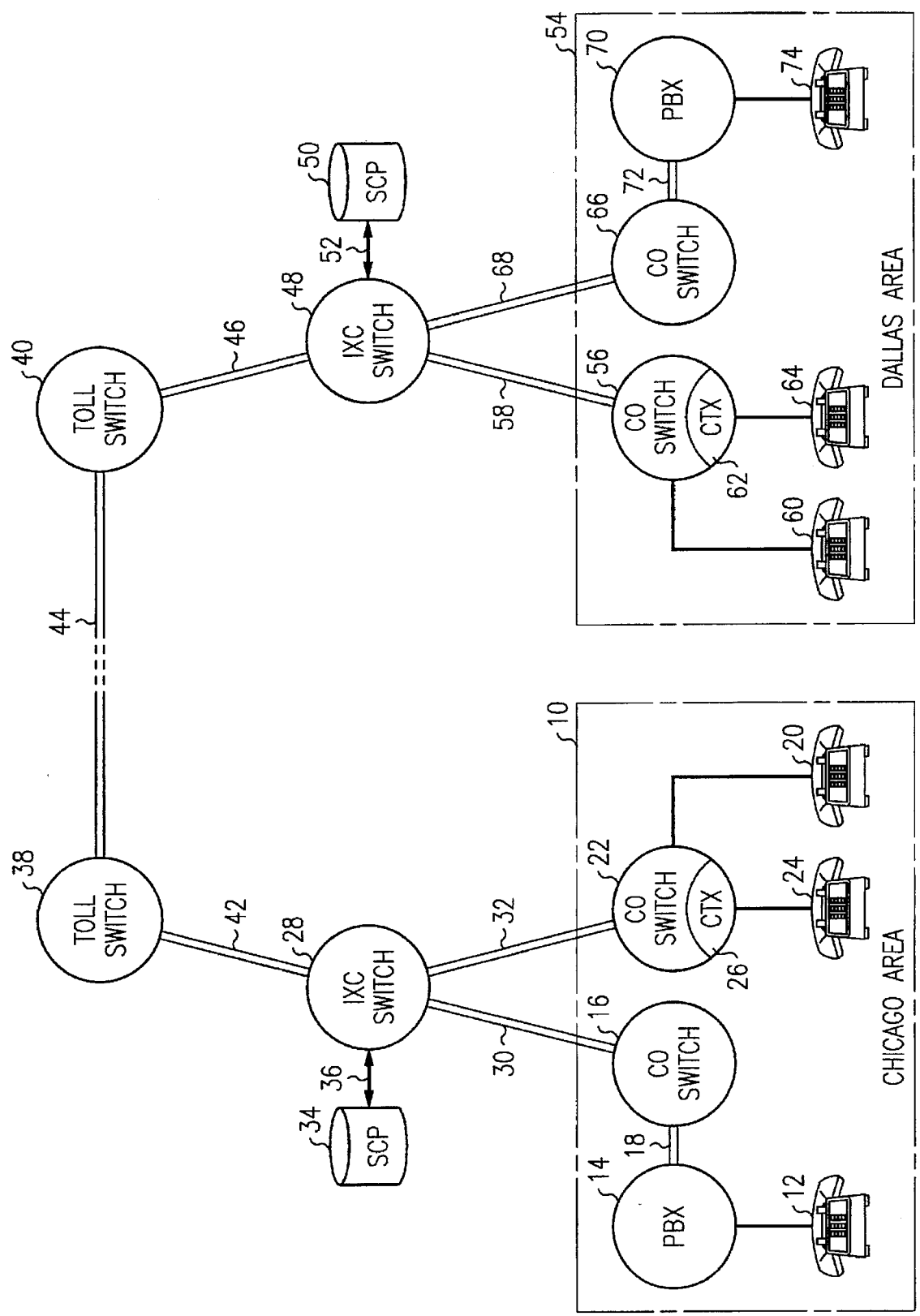

HIERARCHICAL SWITCH SUPPORT OF SERVICES FOR SUBSCRIBERS BASED ON ORGANIZATIONAL MEMBERSHIP

BACKGROUND OF THE INVENTION

The present invention addresses the technique by which public networks control access to features and services by subscribers. More specifically, the invention addresses the access of features from a hierarchical switch by subscribers based on which organization, if any, the subscriber is a member.

Private branch exchanges are typically utilized by groups of subscribers located in one geographic area, such as by employees of a company located at a building or campus. While PBXs support a relatively wide range of subscriber services and features, the features are provided only to subscribers connected directly to the PBX. This provides the subscribers with enhanced features such as abbreviated dialing of other subscribers also served by the same PBX. However, a subscriber served by a PBX is normally required to dial a complete public telephone system number in order to reach another employee of the same company not served by the same PBX. Thus, PBXs have significant limitations associated with the control of subscriber features.

Centrex systems are typically utilized by groups of subscribers, such as employees of a company, and provide features supported by equipment located integral with a local telecommunication switch. Thus, Centrex support is provided by the local exchange carrier (LEC) for its subscribers. Although Centrex systems support a relatively wide range of subscriber services and features, the subscribers are limited in their choice of service providers. Because Centrex services are based on local switch control, network wide solutions to controlling access to features are difficult to implement and administer.

While increased capabilities of consumer premises equipment (CPE) have added to the way features can be accessed by subscribers, such facilities still have limitations. Certain features do not lend themselves to implementation by CPE. For example, a network parameter associated with a call may be required in order to provide an enhanced feature for the subscriber. If the network parameter is not sent to the CPE, it will be apparent that the CPE is incapable of implementing a feature which requires access to this parameter. Since CPE is adapted to individual subscriber control, features which depend on group affiliations are not suited for implementation by the CPE.

Thus, a need exists for an improved public network solution which will permit group affiliations of subscribers to be used in the delivery of features to subscribers.

SUMMARY OF THE INVENTION

It is an object of the present invention to provide a public network solution to this need so that organizational affiliations of subscribers can be used to provide enhanced features.

In accordance with a preferred embodiment of a method of the present invention, a telecommunication network includes first subscribers supported by a first local telecommunication switch. A first signal is received from the first switch at a second telecommunication switch disposed at a hierarchical level above the first switch. The first signal indicates to the second switch that features based on organizational affiliation of the calling party are to be provided. A second signal is received at the second switch from the first switch indicative of the identification of the calling party. A record in a database coupled to the second switch is located in response to receiving the second signal; the location of the record being based on the identification of the calling party. A group affiliation parameter stored in said record is identified; the group affiliation parameter defines one organization of which the calling party is a member. The second switch transmits a call setup message to a third switch associated with a called party. The call setup message includes the group affiliation parameter so that the calling party's membership in the one organization is available for further call processing.

BRIEF DESCRIPTION OF THE DRAWING

FIG. 1 is a block diagram of a telecommunication network which incorporates an embodiment of the present invention.

DETAILED DESCRIPTION

FIG. 1 illustrates a telecommunication network in which local access and transport areas (LATA) support communications among subscribers located in the LATAs. Communications between the LATAs are provided by switches associated with the toll switching system.

The LATA 10 which may be located in the Chicago, Ill. area serves a plurality of subscribers including a business subscriber associated with customer premises equipment (CPE) 12 which may typically consist of a telephone set. However, it will be understood that CPE may consist of various equipment suited for the transmission of data as well as voice communications. The CPE 12 is directly supported by a private branch exchange (PBX) 14 which may comprise an AT&T PBX such as the Definity. The PBX 14 supports a plurality of CPE equipment (not shown) directly coupled to the PBX. A central office switch 16 such as an AT&T 5ESS® switch supports communications from the business subscribers associated with PBX 14 via trunk lines 18 connected between the PBX and the switch. It will be understood that other subscribers can also be directly served by switch 16.

Additional subscribers, for example the subscriber associated with CPE 20, within LATA 10 are supported by central office switch 22. The subscriber associated with CPE 20 may be a residential telephone user or a general member of the public served by a telephone. Another class of subscribers, e.g. a business user associated with CPE 24, are supported by Centrex service equipment 26 associated with central office switch 22. These subscribers typically represent groups of business customers or other groups which desire common calling features among related members which are supported by Centrex services. Although, subscribers served by a PBX or Centrex services may be provided with similar features and capabilities, differences in the implementation of such services often limits the use of the features to other members directly served by the same PBX/Centrex equipment. Switches 16 and 22 may comprise program controlled switches such as the AT&T 5ESS Switch.

An inter-exchange carrier (IXC) switch 28 supports communications with central office switch 16 by trunk lines 30 and central office 22 via trunk lines 32. An inter-exchange carrier provides what is commonly referred to as long distance service and may consist of a carrier such as AT&T Corp. Such carriers provide interLATA communication services. The IXC switch, which may comprise an AT&T 5ESS switch, functions as an edge or point of contact switch with communications from LATA 10. It will be understood by those skilled in the art that switches 16 and 22 will also have trunk communication channels with other intraLATA and interLATA switches. A service control point (SCP) database 34 is coupled to switch 28 by communication lines 36. In accordance with an embodiment of the present invention, the SCP 34 stores a plurality of records corresponding to subscribers served by LATA 10. The records contain individual subscriber data relating to call features and could contain the type of CPE used.

Toll switches 38 and 40 provide backbone interLATA communication services between a LATA and another LATA or a foreign telecommunication jurisdiction. Telecommunication trunk lines 42 provide communications (customer data and telecommunication signaling) between switch 28 and switch 38; trunk lines 44 provide communications between toll switches 38 and 40. Trunk lines 46 connect toll switch 40 and another IXC switch 48. An SCP database 50 is connected to switch 48 by communication channels 52. The SCP database 50 stores records associated with subscribers within LATA The LATA 54 includes a central office switch 56 which is connected by trunk communication lines 58 with IXC switch 48. The switch 56, which may comprise an AT&T 5ESS switch, provides direct subscriber services to residential subscribers, for example a subscriber associated with CPE 60. The switch 56 also provides Centrex services 62 to subscribers, such as the subscriber associated with CPE 64. Central office switch 66 is connected by trunk communication lines 68 with IXC switch 48. PBX 70 is connected by trunk communication lines 72 to switch 66 and supports subscribers such as a business subscriber associated with CPE 74. Switches 56 and 66 are similar to switches 22 and 16. Groups of affiliated business subscribers may be supported by the Centrex or PBX facilities.

The network shown in FIG. 1 is simplified in order to more clearly illustrate the embodiments of the invention. It will be apparent to those skilled in the art that other non-illustrated elements are present and operate to perform known functions. For example, signal transfer points (STPs) are used to transmit data and command information among the switches and databases (SCPs) using data transmission links as is known in signaling system 7. In a high reliability network the STPs and SCPs are deployed in duplicate pairs so that one pair is available in the case the other pair becomes unavailable such as during an unexpected failure or while maintenance is being performed. The shown communication trunk lines between switches are actually two sets of communication links: one for user information such as voice and the other for the transmission of control messages and data between the switches. Not shown are STPs associated with each switch and database; the STPs facilitate the communication of the control data on the separate links.

In accordance with the present invention IXC switch 28 is capable of providing a point of access interaction by trunk lines 30 and 32 to subscribers served directly or indirectly by central office switches 16 and 22. Similarly, IXC switch 48 provides by trunk lines 58 and 68, a point of access interaction with subscribers served directly or indirectly by central office switches 56 and 66. "Point of access" capability of the IXC switches means that these switches have the capability of servicing incoming call requests like a local central office switch. Further details describing the utilization of this capability to provide features in accordance with the present invention are described below with regard to examples of call handling by the network.

As shown in FIG. 1, SCP databases 34 and 50 contain records relating to individual subscribers served by LATAs 10 and 54, respectively. Table 1 illustrates exemplary records stored in these SCP databases. The records associated with CPE 60, 64 and 74 are stored in SCP database 50; the other exemplary records shown in Table 1 are stored in SCP database 34. Each record includes data defining features and CPE type. The record identified with subscriber "PIN(X)" indicates a record identified solely by a personal identification number X as opposed to the other subscriber records shown in Table 1 which are associated with specific CPEs.

Referring to Table 1, a record exists for subscriber 24 which includes data that has predefined features and CPE type. It will be understood that subscribers identified by reference numbers are subscribers associated with the CPE of the same reference number. Typically, records stored in SCP database 34 are located by reference to a predetermined directory number assigned to the subscriber. It will be well known to those skilled in the art that the calling party's directory number can be automatically generated by the supporting central office switch and forwarded to the IXC switch with the call initiation request, such as by utilizing the known signaling system 7 (SS7). This permits the IXC switch to locate the corresponding record in the SCP database.

Referring to Table 1, subscriber 24 has a stored directory number of 312-713-1234 and a predetermined set of features. One feature includes an individualized dial plan (IDP1), also known in telephony as a custom or customized dial plan. The IDP1 defines a business group (BG) dial plan utilized in making business calls and abbreviated called dialing information such as the prefixes, if any, and number of digits associated with extension-only dialing of another business group subscriber. For example, the IDP1 may define that a five digit number constitutes a BG extension if a predetermined leading digit(s) is used.

Another group of features is associated with terminal group and station restrictions (TGSR). The illustrative TGSR features include the definition of a terminal group identification (TGID) of 05 (an intraswitch identification of business group), and further defines business group restrictions associated with subscriber 24 as being a semi-restricted originating (SRO) and unrestricted terminating (URT) permissions. A semi-restricted originating permission restricts the directory numbers which can be called by the subscriber. For example, a subscriber may be limited to directory numbers associated only with his business group or company or to a predetermined local group of directory numbers, so as to restrict toll dialing. With regard to receiving or terminating a call, subscriber 24 is designated as an unrestricted terminating permission indicating that this subscriber can receive all calls without restriction, that is, without limitations.

A multi-switch business group (MBG) feature includes an identification number (MBGID), e.g. an MBGID of 10. This identification can be used across switches to classify related groups of subscribers such as members of the same company which can be used for call control purposes. The CPE type of subscriber 24 is defined as analog with dual-tone multi-frequency (DTMF) signaling capability. This defines the type of CPE equipment associated with the stored directory number of subscriber 24. In view of this illustrative set of features for subscriber 24, it will be apparent that some forms of signaling typically utilized from a CPE to a supporting switch is not utilized by any of the defined features. For example, a flash-hook signal is not needed to activate any feature associated with subscriber 24, and hence would not be recognized by IXC switch 28. However, a flash-hook signal may be recognized by the intermediate central office switch 22 or the related Centrex equipment 26 which are also capable of serving subscriber 24.

The record associated with subscriber 12 as shown in Table 1 is similar to the record associated with subscriber 24. Differences between the records include a different directory number, a different terminal group identification (06 rather than 05) and an unrestricted origination (URO) restriction as opposed to a semi-restricted origination (SRO) restriction for subscriber 24. The unrestricted origination indicates that subscriber 12 has no restrictions on the calls which can be made, i.e. any directory number can be dialed and processed as a valid call request. An SRO restriction would limit the subscriber to call originations to only members of the same BG. It will be noted that subscriber 12 has the same MBGID(10) indicating a common organization or company affiliation with subscriber 24. The CPE type for subscriber 12 is a custom integrated services digital network (ISDN) terminal.

Subscriber 20 has a null entry for features, indicating that this subscriber is to be treated as a plain old telephone service (POTS) type of service. The CPE type is defined as an analog DTMF terminal. The analog CPE type indicates that analog signaling can be originated and received as opposed to the ISDN CPE type associated with subscriber 12 which uses digital signaling using the data or D-channel associated with ISDN lines. Alternatively, no entry (record) for subscriber 20 would be required if a default condition of POTS is assumed for subscribers without records.

A subscriber identified as PIN(X) has a record stored in SCP database 34 but is not associated with a predetermined CPE. The PIN(X) subscriber record is retrieved by a caller entering a personal identification number from any CPE. The features associated with this subscriber are generally similar to the features described with regard to subscriber 12, but does not contain a terminal group identification parameter. However, the PIN(X) subscriber includes an additional feature of "3-WAY" indicating that this subscriber is allowed to make 3-way calls. Since a flash-hook signal, or the equivalent of the flash-hook signal if implemented in ISDN signaling, is utilized for 3-way call signaling, a flash-hook signal will have meaning to and be acted upon by IXC switch 28 during a call involving the PIN(X) subscriber. The CPE type is indicated as "NULL" since the type of CPE equipment which may be utilized by the subscriber is not known.

Table 1 is an example of certain records stored within SCP database 34 in accordance with the present invention. Likewise, stored within this database will be subscriber records associated with features and CPE types for other CPE associated subscribers and PIN identified subscribers within LATA 10.

As shown in Table 1, subscribers 60 and 64 include similar features and CPE definitions as described above. However, it will be noted that these subscribers are supported by IXC switch 48 and hence, their records are stored in the associated SCP database 50. These records are shown in Table 1 for convenience and to enable comparisons to be easily made. The features associated with subscriber 64 are similar to that previously described for subscriber 24 except that the terminal group identification for subscriber 64 is 15 (as opposed to 5 for subscriber 24). It will be further noted that the CPE type for subscriber 64 is a national ISDN (N-ISDN) terminal type. It will be noted that subscribers 12, 24, 64, and PIN(X) are members of the same multiple switch business group as indicated by the same MBGID identification.

In accordance with the embodiments of the present invention, the IXC switch provides features and services that traditionally are provided by a PBX, Centrex, or central office which directly serves the subscribers. Groups of subscribers, such as geographically separated groups of employees of the same corporation, which are served by different PBXs, Centrex equipment, or central offices in different LATAs, can be treated as a common business group for purposes of communication services, and can be provided access to the same dialing plan, features, and services. This constitutes an advantage in that it makes the operation of the telephone services seem the same for the different groups of subscribers.

Call Scenario #1

In this example subscriber 24 makes a call to subscriber 12. The IXC switch 28 provides primary handling of the call even though neither the originating subscriber 24 nor the terminating subscriber 12 are supported directly by switch 28. Since IXC switch 28 provides the primary call processing, enhanced subscriber features can be supported, such as on-network (abbreviated) dialing, even though subscriber 24 is supported by Centrex 26 and subscriber 12 is supported by PBX 14. It will be noted by those skilled in the art that in a conventional system a subscriber supported by Centrex features of a central office switch would not be able to utilize Centrex features such as on-network (abbreviated) dialing except with other subscribers supported by the same Centrex facility. It is similarly true that subscribers traditionally served by a PBX could not utilize such features except with other subscribers supported by the same PBX.

Subscriber 24 goes off-hook and receives dial tone via Centrex 26 and central office switch 22. In this illustrative example, subscriber 24 then dials an access code followed by the abbreviated number for destination subscriber 12. Trunk 32 could be a trunk sharing public traffic (public trunk) or it could be a private dedicated trunk (private trunk). Call processing is discussed for each of these two types of trunks.

Assume in a first example that trunk 32 is a public trunk. Subscriber 24 dials an access code, such as *10288, followed by the abbreviated digits for the called party. The access code digits "*10" inform switch 22 that an alternate carrier is being requested to provide services to the subscriber. The access code digits "288" inform switch 22 that the alternate carrier to provide the services is AT&T. In response to the receipt of the access code, switch 22 will route the call over trunk 32 and provide signaling to switch 28 via trunk 32 requesting that switch 28 provide primary call origination services. This signaling which will be communicated on trunk 32 can be in the form of a network specific facility (NSF) parameter within the signaling system 7 (SS7) call setup message. It will be understood by those skilled in the art that although the SS7 signaling is utilized in this example, other types of signaling which can convey this request to switch 28 can be utilized. The NSF parameter will convey to switch 28 that the call request is for primary call origination services and that the provider of the services is to be 288, i.e. AT&T. Switch 28 then queries SCP 34 database with parameter information designating AT&T as the service provider, as well as including the calling party number, also known as automatic number identification (ANI), abbreviated called digits, and any other necessary information for the query.

In a second example, trunk 32 is a private trunk. Suppose trunk 32 is a dedicated trunk used only for traffic from local subscribers who subscribe to AT&T for their local service. (AT&T is one of the IXC switch 28 providers of primary call origination (e.g. local) services.) Then IXC switch 28 when receiving a call over trunk 32 will know the originator to be an AT&T service subscriber and to query the SCP 34 database with parameter information designating AT&T as the service provider. Again, any other necessary information will be included in the SCP query, such as the calling party number and the abbreviated called digits.

In this case, subscriber 24 may dial an access code, such as "*8", followed by the abbreviated digits for the called party. Note that the *8 could be automatically generated or prefixed by the Centrex 26 custom dial plan, and thus does not necessarily have to be dialed by subscriber 24. If "*8" is automatically transmitted, subscriber 24 just dials the abbreviated digits for subscriber 12. The access code "*8" serves to cause Centrex 26 and central office switch 22 to route the call over trunk 32. Since trunk 32 is dedicated, IXC switch 28 will have predetermined instructions on how to handle the call as described above.

The IXC switch 28 retrieves the records associated with subscribers 24 and 12, compares the MBGID of subscribers 24 and 12, and determines that both the calling and called party are members of the same business group, namely, MBGID=10. In accordance with the illustrative example, calling party 24 is permitted to only make calls via switch 28 to members of its MBG since it has a semi-restricted origination (SRO) parameter. Since subscriber 12 is a member of the same MBG, the call origination screening by IXC switch 28 is satisfied. The switch 28 also conducts a call termination screening using the "_RT" parameters. In this example, subscriber 12 has an unrestricted terminating parameter (URT). Thus, the call terminating screening is passed (satisfied) since all calls via switch 28 are permitted to terminate at subscriber 12.

Since the call origination and termination restrictions are satisfied, switch 28 continues to proceed with the call setup to permit subscriber 24 to communicate with subscriber 12. The IXC switch 28 transmits the required call setup messages to central office switch 16 utilizing signaling system 7. Similarly, central office switch 16 transmits incoming call setup messages over trunks 18 to PBX 14 in order to complete the call to subscriber 12.

With regard to Call Scenario #1, it will be noted that the data stored as records in SCP database 34 for subscribers 24 and 12 constitute "complete" profiles for these end user subscribers. The complete profile means having all of the information for the subscribers that would be provided if the subscriber was directly connected by a local loop/line to the switch 28 instead of being connected by a trunk. This complete profile information allows switch 28 to simulate a loop/line origination from a higher position in the network hierarchy than the central office switch which directly supports the subscriber. As used herein, a switch at a higher hierarchical level refers to a switch closer to the toll network than another switch, i.e. a level further from the requesting subscriber. The IXC switch 28, in addition to serving as a toll switch gateway or edge switch, also functions as a primary call origination switch. The availability of complete profiles of the subscribers in LATA 10 and the superior hierarchical position in the network permits switch 28 to provide enhanced features and call origination functions to subscribers in LATA 10 beyond the conventional features provided by the central office switches and PBXs in LATA 10. Since the IXC switch 28 has a complete profile, it also has knowledge of signals which are relevant to each subscriber; for example, a flash-hook signal initiated by subscriber 24 (or an equivalent ISDN/SS7 representation for a 3-Way conference request if the originator utilizes an ISDN telephone) which was received by IXC switch 28 would be ignored since it has no meaning, that is, no features associated with subscriber 24 require a flash-hook signal.

In the case where subscriber 20 originates a call to subscriber 12, since subscriber 20 is not part of a Centrex, e.g. Centrex 26, subscriber 20 may dial *10288+"called-digits" in order to place a call to subscriber 12. The "called-digits" would be a number that SCP 34 could translate into the "true" number of subscriber 12, this number being usable by IXC switch 28 and central office switch 16 for routing the call. Alternatively, subscriber 20 may not even have to dial the *10288 if it has been provisioned as a preferred primary service provider for subscriber 20 on central office switch 22. Central office switch 22 will then automatically process the call as if the subscriber had dialed the *10288, or whatever access code that would route the call to IXC switch 28 for primary call origination services.

The process of handling a call from PBX supported subscriber 12 to Centrex supported subscriber 24 would follow similar steps. Subscriber 12 would first dial an escape code to obtain a dial tone from central office switch 16. Next, subscriber 12 would dial a further escape code that would cause central office switch 16 to route the call over trunk group 30 with a request for primary call origination services from IXC switch 28. The number of the called party would then be entered either as a complete directory number or an abbreviated dialing plan if such a feature is supported by IXC switch 28. The continuing processing by switch 28 would generally follow that described above with access of information from SCP database 34, call screening, and call termination to the called party if allowed.

Thus, call origination services and features can be provided by an IXC switch for calls originating via a PBX to a Centrex supported subscriber and for calls originating via Centrex equipment to a PBX supported subscriber.

Call Scenario #2

In this example, a person uses CPE 24 to place a call utilizing IXC switch 28 to subscriber 12. This scenario is similar to Scenario #1 except that the call originating person is a PIN user, i.e. see subscriber PIN(X) in Table 1. The call originating person (COP) invokes the call using CPE 24 the same way as explained in Scenario #1 except that the COP enters PIN(X) before entering the abbreviated number for subscriber 12. In this example, the COP's PIN is 998877665. It will be apparent to those skilled in the art that a special code or designator such as the "*" or "#" can be utilized to identify the beginning, end or both of the PIN. The use of the PIN permits IXC switch 28 to identify the COP and utilize the features associated with the COP's record stored in SCP database 34 as identified by the PIN. In this example, the COP is a member of the MBGID of 10 and is also permitted to use 3-way calling as indicated in the features associated with PIN(X) as shown in Table 1.

In accordance with this illustrative example, IXC switch 28 utilizes the features associated with the PIN of the COP as opposed to the features associated with the directory number of the originating CPE 24 which was sent to the switch as part of the call setup request. However, it is also envisioned that the features associated with the COP and CPE 24 can both be retrieved by IXC switch 28 and effectively OR'ed to yield the equivalent of all features allowed to either the COP associated with the PIN or the features associated with the CPE 24. This alternative arrangement could be utilized to provide add-on features for people by associating additional features with an assigned PIN.

The call setup from the COP utilizing CPE 24 to subscriber 12 is accomplished substantially the same as indicated in Scenario #1 except that the IXC switch 28 retrieves from SCP database 34 the record associated with the PIN (or both the PIN and subscriber 24 records in accordance with the alternative embodiment). The call is then completed via central office switch 16 and PBX 14 to subscriber 12.

In accordance with this illustrative example, the COP desires to add to the existing call a third party, subscriber 20, which is not a member of the business group. The COP is authorized to originate calls to other than business group members since the COP has an unrestricted origination (UR0) feature as defined by the PIN(X) record in SCP database 34 (see Table 1). Although subscriber 24 has an SRO feature, as opposed to the URO feature of the COP, the less restrictive URO feature associated with the COP is utilized, thereby permitting call origination outside the business group.

To initiate a 3-way call, the COP, during the established call with subscriber 12, indicates a request for the 3-way call by a flash-hook signal which is passed (e.g. as its equivalent ISDN/SS7 representation for a 3-Way conference request) to IXC switch 28. Since a flash-hook is meaningful with regard to a 3-way feature, and the 3-way feature is an assigned parameter in the record for the COP, the switch 28 responds by putting subscriber 12 on hold and provides dial tone to the COP. The COP enters the directory number for subscriber 20. Upon collecting the directory digits transmitted by the COP, the IXC switch 28 transmits a query to the SCP database 34 seeking information, i.e. a record, corresponding to the entered directory number. Although subscriber 20 is not a member of any business group, the COP has an URO parameter and hence, call origination screening provided by switch 28 is satisfied. The switch 28 then proceeds to transmit a call initiation request to central office switch 22 requesting a call be set up with subscriber 20. A communication link is then established between the COP at CPE 24 and the subscriber 20. The entry of another flash-hook signal by the COP at CPE 24 is transmitted to IXC switch 28 which interprets the second flash-hook as a request to complete the 3-way conference. The switch 28 then releases the "held" call path to subscriber 12. Thus, the COP is in simultaneous communication with subscriber 20 and subscriber 12. It will be apparent to those skilled in the art that the conference circuit needed to satisfy the 3-way call requirements is provided by IXC switch 28 since this switch provides the 3-way call service for such calls. As an alternate to the IXC switch 28 directly providing the 3-way call requirements, the IXC switch could direct (command) switch 22 to set up the 3-way call and pass all needed parameters and data to switch 22.

This call scenario illustrates that a subscriber can utilize a PIN to gain access to a predetermined set of call features that differ from those features assigned to the line being used to originate the call. This permits a member of a group to make calls to other members of the group from a CPE without predetermined group affiliation and without predetermined call features. This allows a group member to retain those call features normally available to members.

Call Scenario #3

In this example, a call originating person (COP) places an interLATA call origination at CPE 20 to subscriber 64. In accordance with the present invention, IXC switch 28 provides primary call processing for the call originating in LATA 10 for a terminating party located in LATA 54.

The beginning of this call is similar to that discussed in call scenario #2 in that the COP utilizes a CPE (CPE 20) to request service from IXC switch 28 via central office switch 22 and trunk 32. The COP enters his PIN (PIN(X)) followed by subscriber 64's abbreviated BG number 8-1234. The IXC switch 28 utilizes the PIN to retrieve the corresponding record from SCP database 34 which is stored in the IXC switch and used during the processing of the call. As will be seen from the subscriber record associated with PIN(X) in Table 1, the COP is associated with business group MBGID=10. The abbreviated BG number entered by the COP for subscriber 64, namely 8-1234, may not find an SCP 34 database record with features and CPE information for subscriber 64 since subscriber 64 is not known in LATA 10. However, an SCP 34 database record will be found that allows translation of 8-1234 to a public routing number; the public routing number will be returned in the query response from SCP 34 to IXC switch 28. Such a translation record could be part of a table stored in SCP database 34 in which each row contains a MGBID group number, a prefix or access code (e.g. "8" in abbreviated number 8-1234), and an area code (e.g. 214) and office code (e.g. 568) corresponding to the prefix code. Thus, a public routing number can be derived based on the record corresponding to the MGBID group number and access code.

IXC switch 28 will use the public routing number to route the call through the toll network to IXC switch 48. The originally dialed abbreviated number, 8-1234, will be preserved in some SS7 parameter, e.g. the access transport parameter (ATP), for use at IXC switch 48. The COP is granted permission to complete the interLATA MBG call to IXC switch 48 since no terminating screening can be done at this time at IXC switch 28. The PIN(X) subscriber's URO restriction will be carried in the SS7 BG parameter to IXC switch 48 where originating and terminating screening will be done for the MBG call. Using the public routing number returned from SCP 34, IXC switch 28 and toll switches 38 . . . 40 route the call to the terminating IXC switch 48. However, IXC switch 28 includes additional information in the call setup message sent on the SS7 trunk 42 to toll switch 38 that includes the BG parameter indicating the business group, originating restrictions, terminating restriction of the calling party, an NSF parameter (also called hierarchical parameter herein) indicating that hierarchical services by the IXC switch(es) are to be provided for the call, and an ATP that contains the originally dialed abbreviated number. These pieces of information are in addition to other conventional call setup message information which will be forwarded in a conventional manner. The called party number, which is actually the public routing number used to route the call to IXC switch 48, addresses IXC switch 48. This indicates to IXC switch 48 that switch 48 is the terminating IXC switch for this call. The called number is received at IXC switch 48 along with the NSF and BG parameters, and the ATP which carries the abbreviated number for subscriber 64. IXC switch 48 interprets this information as requiring a query of SCP database 50 for information concerning the abbreviated called party number (subscriber 64). This query is made in order to provide both call origination and termination screening.

If the screening process permits the call, the IXC switch 48 forwards the required setup information to the associated central office switch which processes the termination of the call to the desired party. However, if the screening process fails, i.e. it is determined that the terminating party is not permitted to receive the call request, the IXC switch gives the call originator appropriate terminating error treatment, e.g. playing an error announcement to the call originator.

Referring to Table 1, the record associated with "214-568-1234", i.e. subscriber 64, is retrieved from SCP database 50. This data identifies the subscriber as being a member of business group 10 and that the subscriber is SRT, meaning that the subscriber can receive calls via an IXC switch only from a business group member. However, since the COP is also a member of the same business group, the call passes terminating screening. Since the originating restrictions for the COP are URO (carried in the SS7 BG parameter), the call passes call originating restrictions as well. Having passed call origination and call termination restrictions, the call is further advanced by the IXC 48 transmitting a call setup message to central office switch 56 and associated Centrex equipment 62 which completes the call to subscriber 64.

In accordance with this call scenario, the IXC switches 28 and 48 support independent call origination screening and call termination screening. A subscriber can utilize a PIN to gain access to a predetermined set of call features for an interLATA call. This permits a member of a group to make calls to other members of the group from a CPE in another LATA and retain those features normally available to the members.

Call Scenario #4

In this example a subscriber 12 of PBX 14 places an interLATA call to subscriber 64 of Centrex services 62. Subscriber 12 dials some access code and the called number, e.g. *10-xxx-7/10 digits. The xxx is the carrier ID (CIC) or service provider located at IXC switch 28 from whom subscriber 12 wishes to obtain originating services. The *10–xxx is a signal (access code) to the local CO switch 16 that this call is requesting "originating services" from the "xxx" service provider (e.g. AT&T or MCI) at IXC switch 28. CO switch 16 routes the call over trunk 30 applying the appropriate signaling to let IXC switch 28 know that this is a call request for originating services. Such signaling to IXC switch 28 could be as simple as the call coming in over a "dedicated" trunk 30, or having received an SS7 network specific facility (NSF) parameter for said service. It will also be understood that an abbreviated dialing plan could be used to identify the called party instead of the 7/10 digit called party number since the originating party will normally have abbreviated dialing as a supported PBX feature.

Upon receiving the call and signaling, IXC switch 28 is programmed to query the SCP 34 database for the appropriate "xxx" (Carrier ID or CIC) for subscriber 12. Subscriber 12's ANI (calling party number) is also used at the IXC switch 28 for billing the call. IXC switch 28 is programmed to query the SCP 34 database for the appropriate service provider "xxx" to obtain the calling party's information, e.g. information defining their allowed features and assigned terminal equipment. The retrieved information from SCP 34 identifies subscriber 12 as being a member of business group 10 with URO and URT features; Table 1 shows the defined features. SCP 34 also provides the public routing number to IXC switch 28 so that the call can be routed to IXC switch 48. Alternatively, an SCP database which is dedicated to one service provider would not require a query to locate the service provider since the carrier in this case could be assumed.

SS7 signaling to IXC switch 48 includes information (e.g. an SS7 NSF parameter) identifying the call as one having requested originating services from an IXC switch. Additionally, the SS7 signaling conveys the business group affiliation and the origination and termination restrictions associated with subscriber 12. This serves to cause IXC switch 48 to query its SCP 50 database before terminating the call to a local network, e.g. to trunk 58. IXC switch 48 retrieves information from SCP 50 on the called party 64, e.g. subscriber 64's restrictions, if any. If IXC switch 48 and SCP 50 determine that the call can be allowed to complete, the call is advanced to CO switch 56 which completes the call to subscriber 64. In this instance, the call is allowed to complete. Although subscriber 64 has an SRT restriction, it is satisfied since subscriber 12 has the same business group affiliation.

In this example, a PBX subscriber is allowed to use enhanced features even while making an interLATA call to a Centrex subscriber of the same business group affiliation. Thus, neither the interLATA nature of the call nor the mix of PBX and Centrex supported subscribers inhibited the use of enhanced features.

General Information

The above examples illustrate that enhanced subscriber features need not be restricted by limitations associated with the calling party's equipment (PBX or Centrex) or local central office capabilities. An important aspect of this invention resides in recognizing and solving the problems which prevented members of affiliated groups from utilizing enhanced features that were available within their local equipment/LATA community when making calls to other members of the group served by different types of equipment or located in different LATAs.

It will be apparent that other variations of the uses of the above embodiments of the present invention can be made. For example, a 1-800-xxx-yyyy number could be used in place of an access code as a way of conveying a request to an IXC switch for call origination support. The IXC switch would receive this call request from a local central office and, after querying its associated SCP database, would recognize the 800 call request in combination with the calling party number as a request for call origination support. In another aspect, a single setup message, which could be equivalent to a series of signals, could be received by the IXC switch containing all required signals and information needed to permit call origination services to be provided to a requesting subscriber.

In view of the above descriptions of embodiments, it will be apparent that other call scenarios are supported by this invention. For example, a subscriber 12 of PBX 14 in LATA 10 can utilize call origination services, such as abbreviated dialing, membership-based call screening, 3-way conferencing, etc., provided by IXC switches 28 and 48 when calling a subscriber 74 of PBX 70 in LATA 54. Similarly, Centrex subscriber 24 served by a local switch 22 in LATA 10 can utilize call origination services provided by IXC switches 28 and 48 when calling a Centrex subscriber 64 served by local switch 56 in LATA 54. Thus, call origination services from an IXC switch can support PBX to PBX, PBX to Centrex, Centrex to PBX, and Centrex to Centrex calls as well as calls not supported by either PBX or Centrex services.

Although embodiments of the invention have been described above, the scope of the invention is defined by the claims which follow.

TABLE 1

| Subscriber | Features | CPE Type |
| --- | --- | --- |
| 24 | IDP1 | Analog |
| 312-713-1234 | TGSR: | DTMF |
| | TGID = 05 | |
| | SRO | |
| | URT | |
| | MBG: | |
| | MBGID = 10 | |
| 12 | IDP1 | Custom ISDN |

TABLE 1-continued

| Subscriber | Features | CPE Type |
|---|---|---|
| 708-979-1234 | TGSR:<br>TGID = 06<br>URO<br>URT<br>MBG:<br>MBGID = 10 | |
| 20<br>312-713-1235<br>Pin (X)<br>998-877-665 | Null<br><br>IDP1<br>MBG:<br>MBGID = 10<br>URO<br>URT<br>3-WAY | Analog<br>DTMF<br>Null |
| 64<br>214-568-1234 | IDP1<br>TGSR:<br>TGID = 15<br>SRO<br>SRT<br>MBG:<br>MBGID = 10 | N-ISDN |
| 60<br>214-568-7981 | Null | Analog<br>DTMF |
| 74<br>214-979-3535 | IDP1<br>TGSR:<br>TGID = 12<br>URO<br>URT<br>MBG:<br>MBGID = 10 | Analog<br>DTMF |

The invention claimed is:

1. In a telecommunication network where first subscribers are supported by a first local telecommunication switch, a method for providing call features based on organizational affiliation of the calling party, the method comprising the steps of:
   receiving a first signal from the first switch at a second telecommunication switch disposed at a hierarchical level above the first switch, the first signal indicating to the second switch that features based on organizational affiliation of the calling party are to be provided;
   identifying at the second switch a group affiliation parameter associated with the calling party, the group affiliation parameter defining one organization of which the calling party is a member;
   the second switch transmitting a call setup message to a third switch associated with a called party, the call setup message based on the group affiliation parameter so that the calling party's membership in the one organization is available for further call processing;
   inserting a hierarchical parameter in the call setup message, the hierarchical parameter indicating that call origination services are being sought from the second hierarchical switch.

2. The method according to claim 1 further comprising the step of the second switch validating the authority of the calling party to make the call based at least in part on the group affiliation parameter.

3. In a telecommunication network where first subscribers are supported by a first local telecommunication switch, a method for providing call features based on organizational affiliation of the calling party, the method comprising the steps of:
   receiving a first signal from the first switch at a second telecommunication switch disposed at a hierarchical level above the first switch, the first signal indicating to the second switch that features based on organizational affiliation of the calling party are to be provided;
   receiving a second signal at the second switch from the first switch indicative of the identification of the calling party;
   generating at the second switch a query to locate a record in a database coupled to the second switch, the location of the record being based on the identification of the calling party as defined by the second signal;
   identifying a group affiliation parameter stored in said record, the group affiliation parameter defining one organization of which the calling party is a member;
   the second switch originating and transmitting a call setup message to a third switch associated with a called party, the call setup message including the group affiliation parameter so that the calling party's membership in the one organization is available for further call processing.

4. The method according to claim 3 further comprising the step of validating, by the second switch, the authority of the calling party to make the call based at least in part on the group affiliation parameter as stored in said record.

5. The method according to claim 3 further comprising the step of inserting a hierarchical parameter in the call setup message, the hierarchical parameter indicating that call origination services are being sought from the second hierarchical switch.

6. In a telecommunication network where first subscribers are supported by a first local telecommunication switch, a method for providing call features based on organizational affiliation of the calling party, the method comprising the steps of:
   receiving a first signal from the first switch at a second telecommunication switch disposed at a hierarchical level above the first switch, the first signal indicating to the second switch that features based on organizational affiliation of the calling party are to be provided;
   receiving a second signal at the second switch from the first switch indicative of the identification of the calling party;
   locating a record in a database coupled to the second switch in response to receiving the second signal, the location of the record being based on the identification of the calling party as defined by the second signal;
   identifying a group affiliation parameter stored in said record, the group affiliation parameter defining one organization of which the calling party is a member;
   the second switch transmitting a call setup message to a third switch associated with a called party, the call setup message based on the group affiliation parameter so that the calling party's membership in the one organization is available for further call processing;
   inserting a hierarchical parameter in the call setup message, the hierarchical parameter indicating that call origination services are being sought from the second hierarchical switch.

7. The method according to claim 6 further comprising the step of validating the authority of the calling party to make the call based at least in part on the group affiliation parameter as stored in said record.

8. In a telecommunication network where first subscribers are supported by a first local telecommunication switch, an improvement in providing call features based on organizational affiliation of the calling party comprising:
   means for receiving a first signal from the first switch at a second telecommunication switch disposed at a hierarchical level above the first switch, the first signal indicating to the second switch that features based on organizational affiliation of the calling party are to be provided;

means for receiving a second signal at the second switch from the first switch indicative of the identification of the calling party;

means for locating a record in a database coupled to the second switch in response to receiving the second signal, the location of the record being based on the identification of the calling party as defined by the second signal;

means for identifying a group affiliation parameter stored in said record, the group affiliation parameter defining one organization of which the calling party is a member;

the second switch transmitting a call setup message to a third switch associated with a called party, the call setup message based on the group affiliation parameter so that the calling party's membership in the one organization is available for further call processing;

means for inserting a hierarchical parameter in the call setup message to indicate that call origination services are being sought from the second hierarchical switch.

* * * * *